(12) United States Patent
Chopra et al.

(10) Patent No.: US 12,486,047 B2
(45) Date of Patent: Dec. 2, 2025

(54) AUTOMATED TRACKING OF AIRCRAFT LOADING AND UNLOADING

(71) Applicant: The Boeing Company, Arlington, VA (US)

(72) Inventors: Seema Chopra, Bengaluru (IN); Aravindan Krishnan, Bengaluru (IN); Vinod Kumar Reddy Bachili, Bengaluru (IN); Amrutha Govind, Bengaluru (IN); Dhara Pandya, Bengaluru (IN)

(73) Assignee: The Boeing Company, Arlington, VA (US)

( * ) Notice: Subject to any disclaimer, the term of this patent is extended or adjusted under 35 U.S.C. 154(b) by 337 days.

(21) Appl. No.: 18/307,683

(22) Filed: Apr. 26, 2023

(65) Prior Publication Data

US 2024/0359825 A1 Oct. 31, 2024

(51) Int. Cl.
*B64F 1/32* (2006.01)
*B65G 69/00* (2006.01)
*G06V 20/52* (2022.01)
*G06V 20/64* (2022.01)

(52) U.S. Cl.
CPC .............. *B64F 1/324* (2020.01); *B65G 69/00* (2013.01); *G06V 20/52* (2022.01); *G06V 20/64* (2022.01); *B65G 2203/0233* (2013.01); *B65G 2203/041* (2013.01); *G06T 2207/30242* (2013.01)

(58) Field of Classification Search
CPC ........ G06V 20/52; G06V 20/56; G06V 20/64; B64D 47/08; B64D 47/02; B64D 47/00; G01S 17/04; G01S 7/4808; G01S 7/497; G06Q 10/087; G06Q 10/083; G06T 7/62; G06T 2207/30242; B64F 1/324; B65G 69/00; B65G 2203/0233; B65G 2203/041
USPC ......................................................... 382/103
See application file for complete search history.

(56) References Cited

U.S. PATENT DOCUMENTS

| 12,304,654 | B2 * | 5/2025 | Goyal | G06V 10/82 |
| 2018/0038991 | A1 * | 2/2018 | Chennakeshu | G01V 8/12 |
| 2020/0047347 | A1 * | 2/2020 | Zhang | B65G 65/30 |
| 2020/0128226 | A1 * | 4/2020 | Krishnamurthy | G06Q 10/083 |
| 2024/0242514 | A1 * | 7/2024 | Evans | G06T 7/62 |

* cited by examiner

*Primary Examiner* — Kathleen Y Dulaney
(74) *Attorney, Agent, or Firm* — Alleman Hall & Tuttle LLP (57) ABSTRACT

Examples are disclosed that relate to automated tracking of aircraft turnaround. One example provides a method, comprising obtaining object classification data for a plurality of image frames, the object classification data comprising location data for a fuselage of the aircraft and location data for a loadable object, determining a first distance between the fuselage and the loadable object in a first frame of the plurality of image frames, and determining a second distance between the fuselage and the loadable object in a second, later frame of the plurality of image frames. The method further comprises determining that the loadable object is being loaded based at least on the second distance being less than the first distance, or determining that the loadable object is being unloaded based at least on the second distance being greater than the first distance, and outputting the determination.

20 Claims, 7 Drawing Sheets

AUTOMATED TRACKING OF AIRCRAFT LOADING AND UNLOADING

FIELD

The field of the present disclosure relates generally to automated image processing tasks and, more specifically, to systems and methods of automated decision making based on multi-object tracking data.

BACKGROUND

Airport turnaround represents ground processes for an aircraft at an airport. Ground processes include cargo loading and unloading, passenger loading and unloading, refueling, inspection and maintenance, and other services.

SUMMARY

Examples are disclosed that relate to automated tracking of aircraft turnaround. One example provides a method for determining a status of an aircraft at an airport. The method comprises obtaining object classification data for a plurality of image frames, the object classification data comprising location data for a fuselage of the aircraft and location data for a loadable object. The method further comprises, based at least on the location data for the fuselage and the location data for the loadable object, determining a first distance between the fuselage and the loadable object in a first frame of the plurality of image frames. The method further comprises, based at least on the location data for the fuselage and the location data for the loadable object, determining a second distance between the fuselage and the loadable object in a second, later frame of the plurality of image frames. The method further comprises determining that the loadable object is being loaded based at least on the second distance being less than the first distance, or determining that the loadable object is being unloaded based at least on the second distance being greater than the first distance. The method further comprises outputting the determination that the loadable object is being loaded or unloaded.

DETAILED DESCRIPTION

Airport turnaround refers to the collection of ground activities and services for processing an aircraft at a gate of an airport. For example, after landing, an aircraft taxies to a gate and parks. Various ground processes occur at the gate to service the aircraft. For example, cargo item, luggage, and/or passengers are unloaded from the aircraft. The aircraft can be refueled, inspected, cleaned, and resupplied with service items. Additionally, cargo items, luggage, and/or passengers are loaded onto the aircraft to prepare the aircraft for a next flight. Other ground processes also can be performed, such as a crew change or maintenance. Airport operators and/or aircraft operators monitor turnaround activities for reasons such as flight scheduling, efficient use of aircraft, or efficient use of airport facilities. Operators may estimate efficiency based upon turnaround time, which is the total time that an aircraft is parked at a gate. Operators also may monitor turnaround milestones, such as completion of loading, unloading, or other ground service.

However, many ground processes are human-monitored, which can lead to inefficiencies and inaccuracies. For example, human monitoring at each gate can add labor costs. Additionally, it may be difficult for human observers to monitor multiple simultaneous ground processes and record start times, progress, and completion times for these processes. Monitoring activities at multiple gates is further challenging.

Accordingly, examples are disclosed that relate to automated tracking of aircraft turnaround. Briefly, a camera captures images of an airplane at a gate of an airport. The image frames are input into a trained multi-object tracker (MOT) configured to identify objects in the image frames and form object classification data. The object classification data includes location data for the aircraft and location data for a loadable object (e.g., passenger, cargo item, luggage item). Based on the object classification data, the automated tracking method can perform inference logic to track turnaround activities. For instance, based on a first image frame, a first distance between the loadable object and the aircraft is determined. This is compared to a second distance between the loadable object and the aircraft in a second image frame. If the distance is increasing, the status of the loadable object is determined as being "unloaded". If the distance is decreasing, the status of the loadable object is determined as being "loaded". The determination can be output to a data file and/or used for further inference logic, such as determining a start time or completion time for a ground process. Examples of multi-object trackers and inference logic are described in more detail below. By performing automated tracking of loading and unloading processes without a human observer, the disclosed examples can provide labor cost savings. Further, the disclosed examples can provide more detailed information regarding such processes, which in turn can be used to improve scheduling and efficiency.

Figure 1:
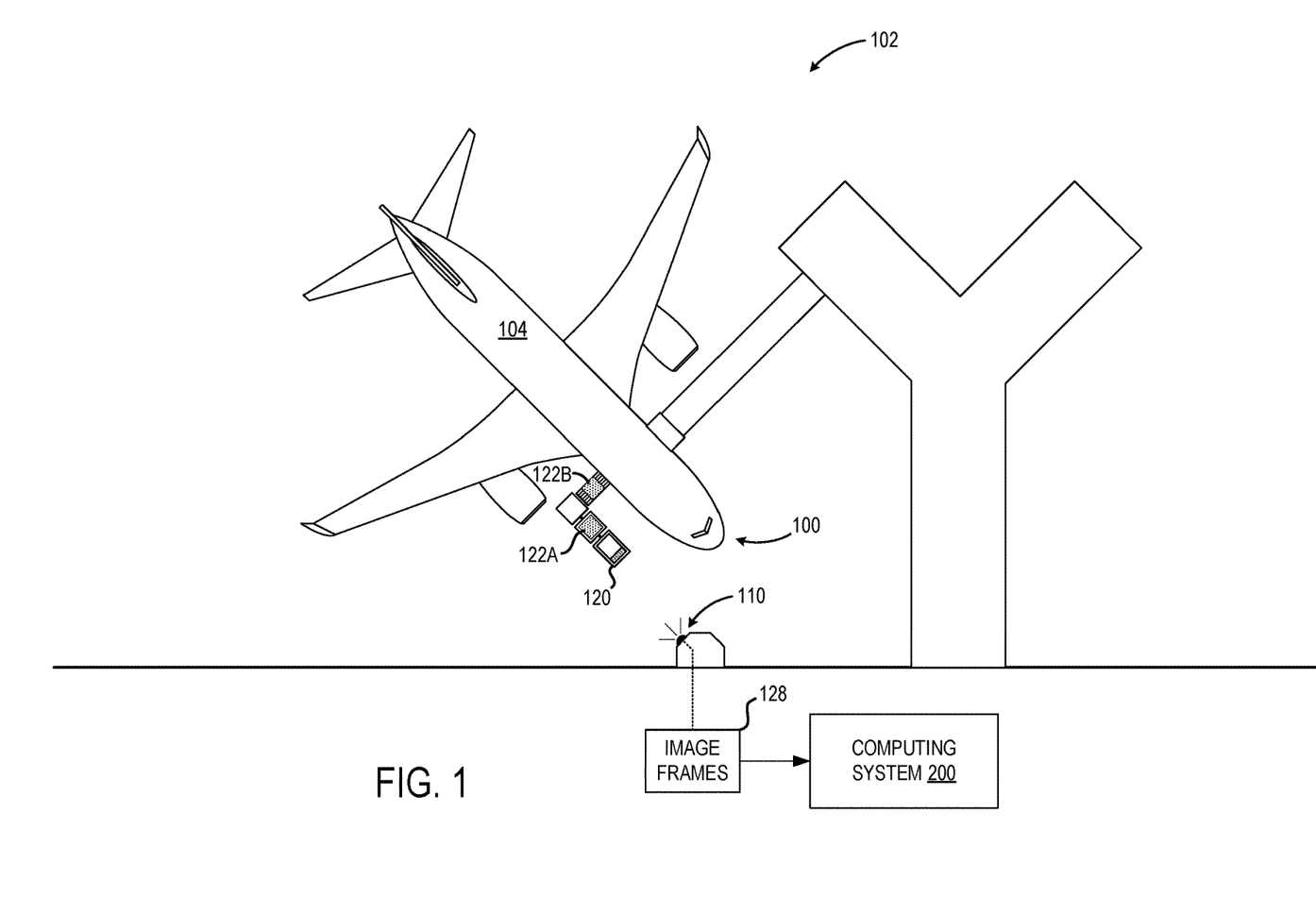
FIG. 1 shows an example use environment in which a camera images a aircraft at an airport gate.

FIG. 1 schematically shows an example use environment including an aircraft 100 parked at a gate 102 of an airport. Aircraft 100 comprises a fuselage 104. A camera 110 captures a plurality of images (e.g., real-time video) of aircraft 100. Camera 110 can be used to image aircraft 100 during turnaround at gate 102. As mentioned above, turnaround can comprise various ground processes such as cargo loading and unloading. In the example scene, a cargo truck 120 is present. In the example shown, cargo truck 120 is unloading cargo items 122A and 122B from aircraft 100. As such, camera 110 can be used to image the cargo unloading and loading processes. Image frames 128 captured by camera 110 are transmitted to a computing system 200 for processing.

Figure 2:
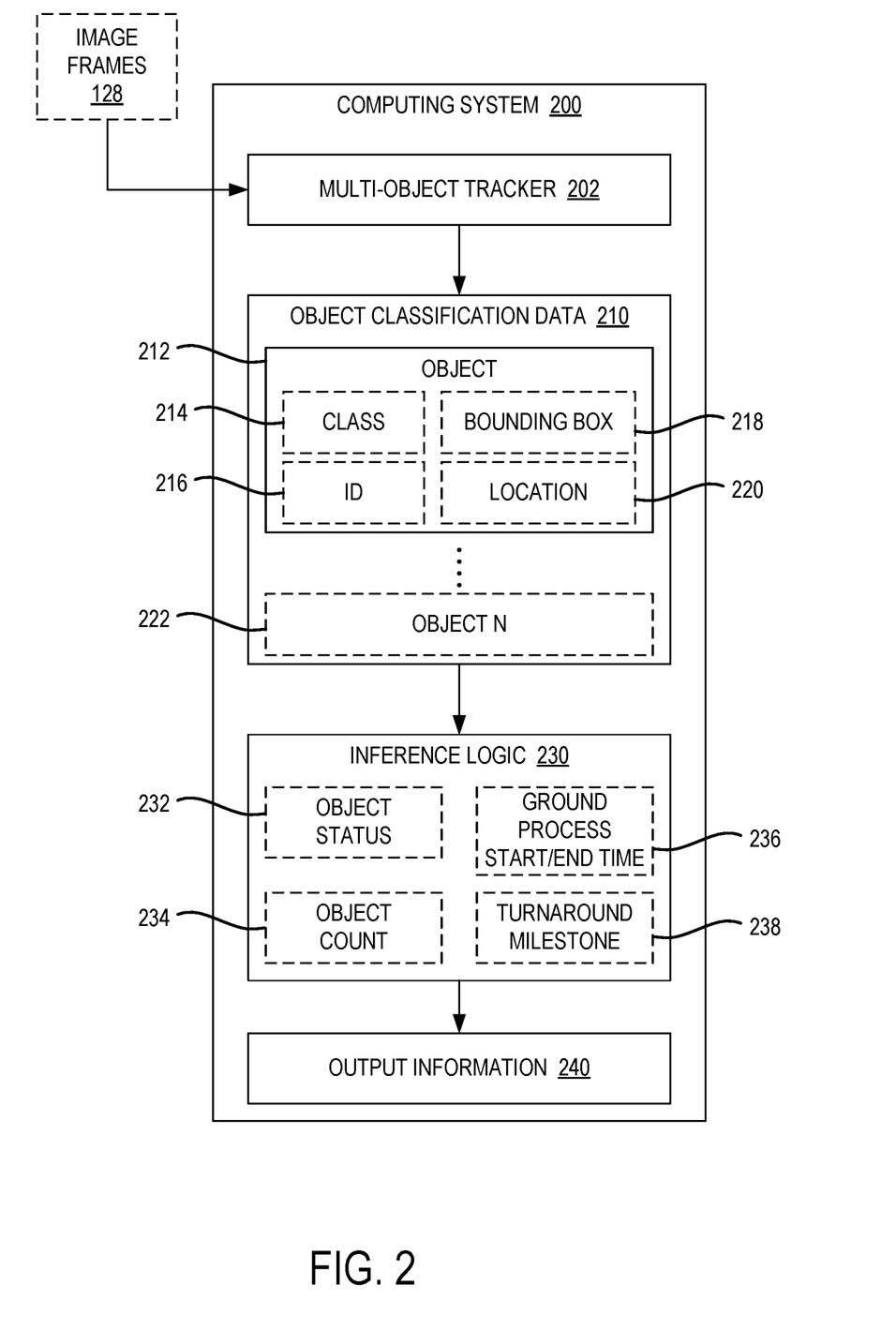
FIG. 2 schematically shows an example computing architecture for a system for obtaining object classification data and determining the status of a loadable object based on the object classification data.

FIG. 2 shows a schematic view of computing system 200. Computing system 200 comprises a logic machine and a storage machine storing instructions executable by the logic machine to process image data (e.g., image frames 128). For example, computing system 200 comprises instructions to implement a multi-object tracker 202. Multi-object tracker 202 is configured to analyze the image frames, identify one or more objects in the image frames, and identify image frame pixels that form each object.

Multi-object tracker 202 comprises any suitable algorithm for analyzing image content and classifying objects. In some examples, the multi-object tracker utilizes a classifying function to analyze each image frame of a plurality of image frames and identify one or more objects in each image frame. Object classification tasks can be performed using a neural network. Examples include Convolutional Neural Networks (CNN), Regions with CNN (R-CNN), and Single Shot Detection (SSD). More specific examples include Fast R-CNN, Faster R-CNN, Region-based Fully Convolutional Network (R-FCN), YOLO, and variants thereof. Further, the multi-object tracker may comprise SORT, DeepSORT, or Joint Detection and Embedding (JDE) algorithms, as examples.

Thus, multi-object tracker 202 identifies one or more objects in each image frame and forms object classification data 210. Object classification data 210 comprises information regarding an object 212 identified in the image frames. For example, multi-object tracker 202 can identify an object 212 and classify the object to determine a class 214 for the object. As a more specific example, multi-object tracker 202 can be trained to classify an aircraft, a fuselage, and a vehicle such as a cargo truck or fuel vehicle. Multi-object tracker 202 is also configured to classify loadable objects including passengers, luggage, and cargo items. In some examples, multi-object tracker 202 outputs a confidence score for each object indicating a probability of correct classification for the object. Further, in some examples, multi-object tracker 202 is configured to process image frames from a camera in real-time. Additionally, in some examples, multi-object tracker 202 is configured to process a plurality of sets of image frames from a respective plurality of cameras.

Multi-object tracker 202 also assigns object 212 an ID number 216. The multi-object tracker can maintain a unique ID number for an object identified in multiple image frames. For example, each cargo item of a plurality of cargo items can be assigned a unique ID number. In this manner, the multi-object tracker can track a specific object across a plurality of image frames. Further, a bounding box 218 and a location 220 also are determined for object 212 for each image frame. A bounding box for an object defines a portion of the image frame in which that object is located. Thus, image frame pixels identified as part of object 212 are contained within bounding box 218. In some examples, bounding box 220 comprises a rectangle. In other examples, any suitable shape can be used (e.g., square, circle, ellipse). Further, location 220 can be defined in any suitable manner. In some examples, location 220 is calculated as the center of bounding box 218. In other examples, location 220 can be calculated as a corner, or other position of bounding box 218. In still further examples, location 220 can be calculated based on one or more image frame pixels assigned to object 212 (e.g., a center of mass of the image frame pixels). As indicated at 222, object classification data may comprise information related to any number N of objects identified in image frames 128.

Figure 3A:
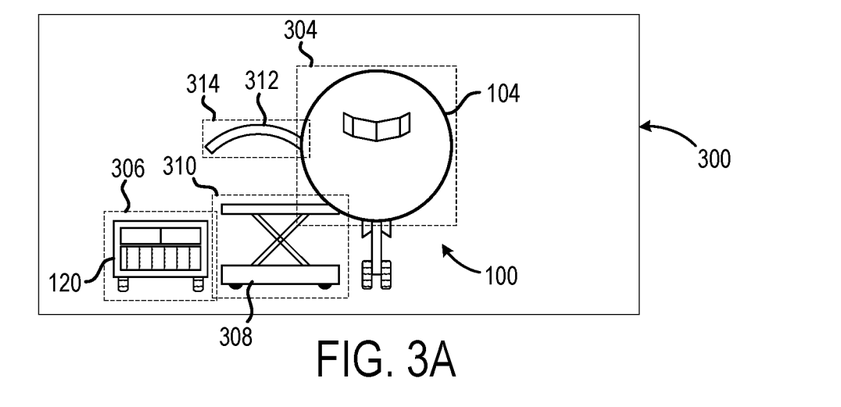
FIGS. 3A-3C schematically show an example scenario in which object classification data is used to determine a cargo item loading status.
Figure 3B:
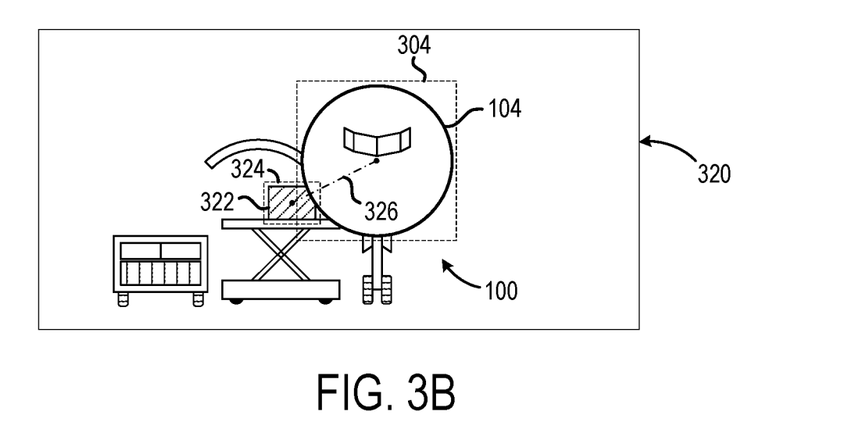
Figure 3C:
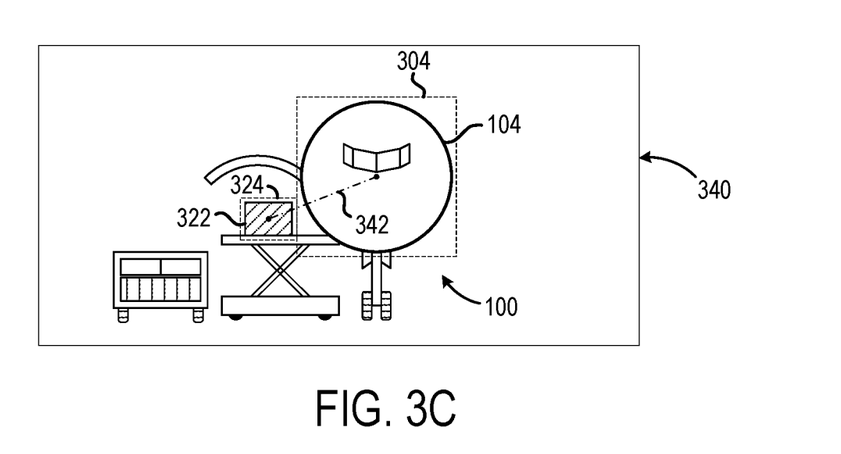
Figure 4A:
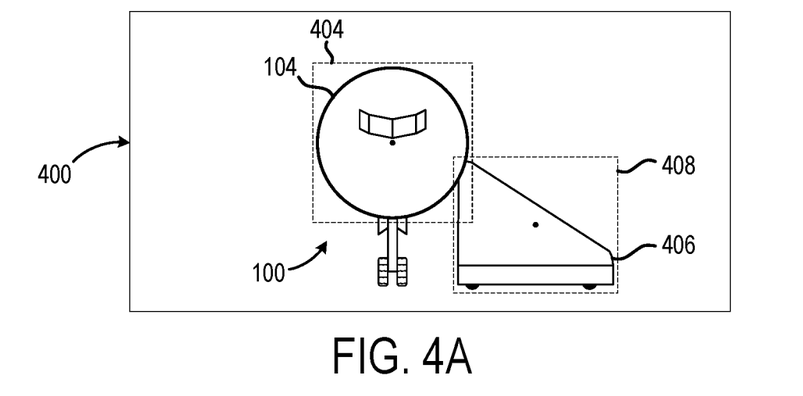
FIGS. 4A-4C schematically show an example scenario in which object classification data is used to determine a passenger loading status.
Figure 4B:
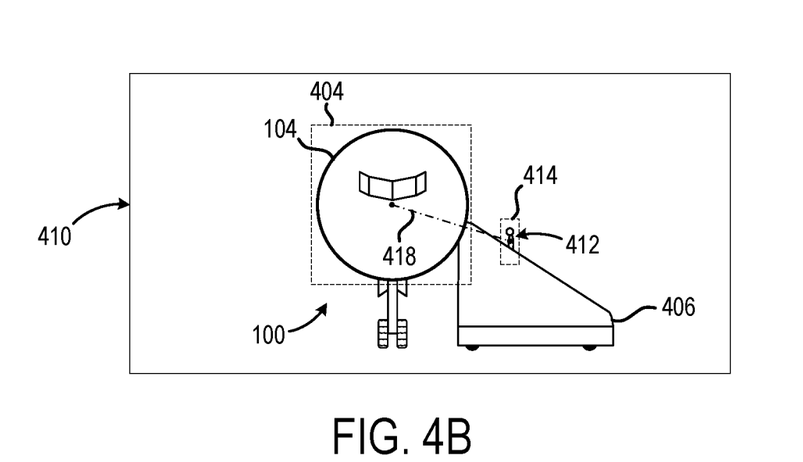
Figure 4C:
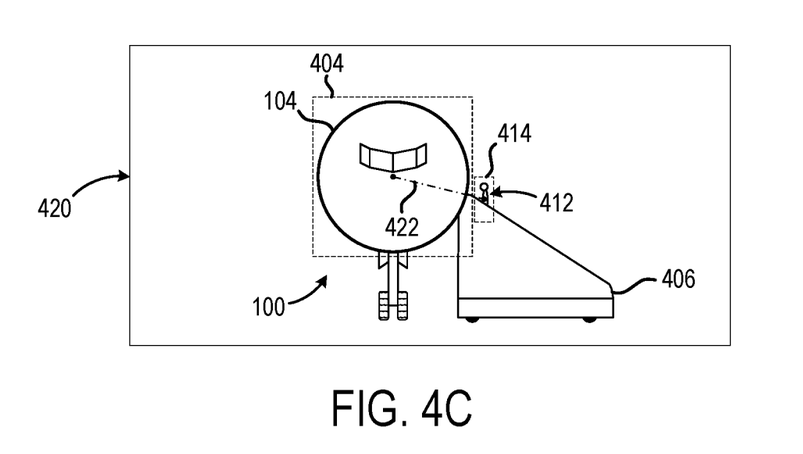

Computing system 200 is further configured to analyze object classification data 210 via inference logic 230. As used herein, inference logic refers to computer-implemented methods for determining information regarding an object identified by the multi-object tracker. Inference logic is implemented by computer-readable instructions stored on computing system 200. At 232, inference logic 230 may comprise logic for determining a status of an object. For example, inference logic can determine the status of aircraft 100 as "parked". Such a determination can be made based on a location of the aircraft in the image frame and/or due to a stationary location of the aircraft across two or more image frames. Further, inference logic can comprise logic for determining the status of a fuselage door as "open" or "closed". Such a determination can be made based on location, orientation, and/or appearance of the fuselage door, for example. Inference logic 230 also can be used to determine a status of a loadable object as being "loaded" or being "unloaded". As described in more detail below, FIGS. 3A-3C illustrate an example scenario where inference logic is used to determine a status of a cargo item as being unloaded. FIGS. 4A-4C illustrate another example scenario where inference logic is used to determine a status of a passenger as being loaded.

Figure 5A:
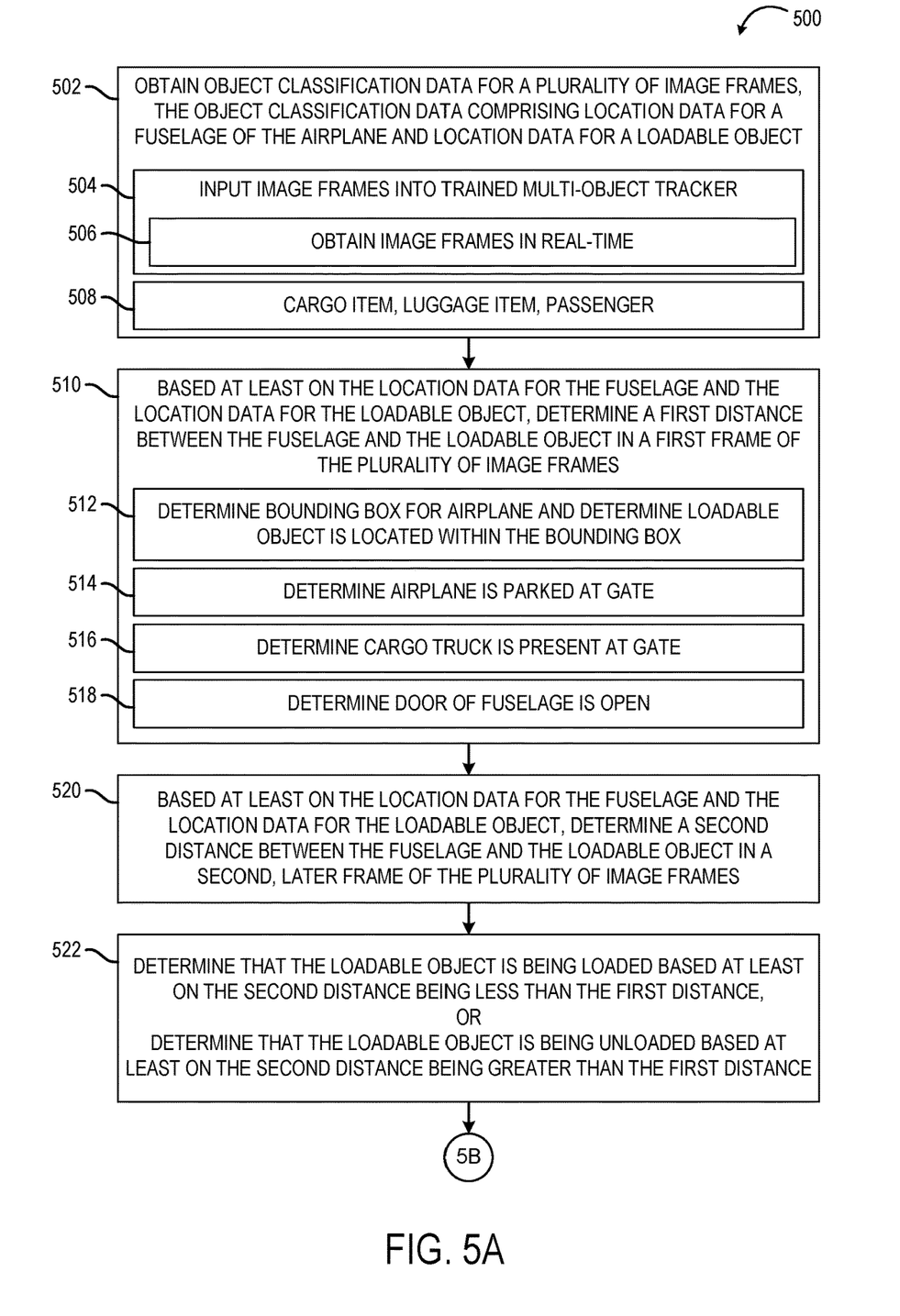
FIGS. 5A-5B show an example flow diagram for processing image frame data and object classification data to determine a status of a loadable object.
Figure 5B:
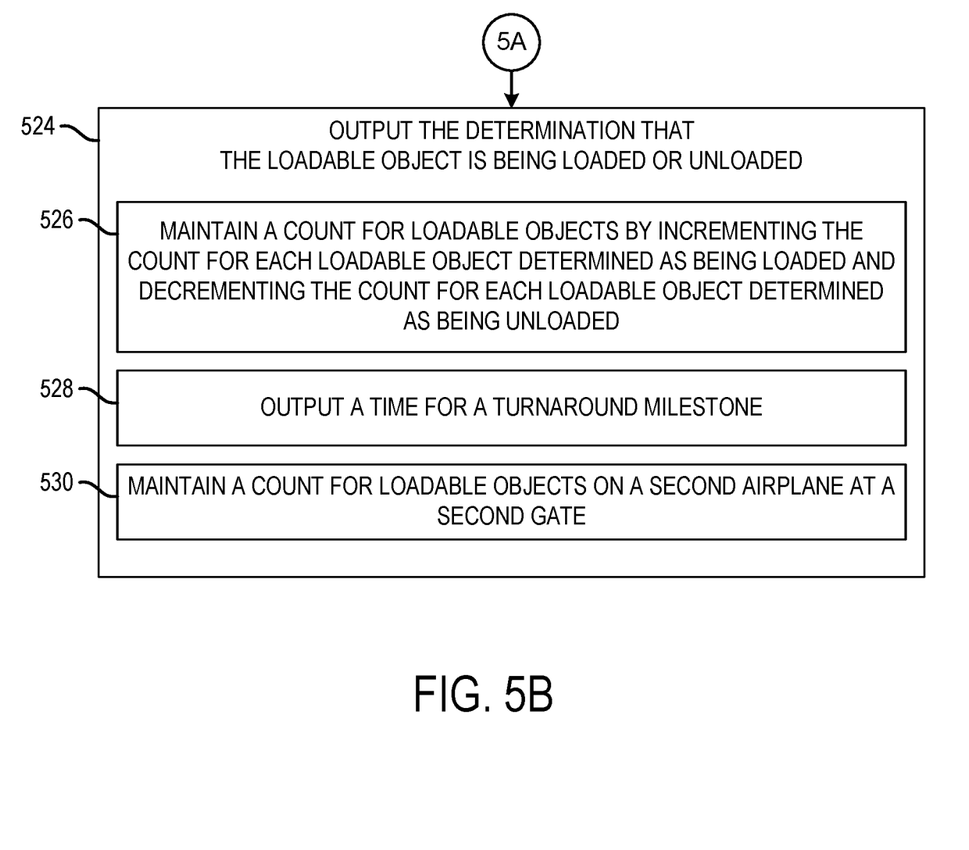

Inference logic 230 further optionally comprises logic configured to maintain an object count at 234. For example, as the multi-object tracker 202 can assign each object a unique ID number, inference logic 230 may maintain a count of unique objects of a class. Examples include maintaining a count of loadable objects such as passengers, luggage items, or cargo items. Inference logic 230 further optionally comprises logic configured to determine a start time or end time for a ground process at 236. Inference logic 230 further optionally comprises logic configured to determine a turn-around milestone at 238. Examples of inference logic are discussed in more detail below with regard to FIG. 5.

Based on results from inference logic 230, computing system 200 outputs information at 240. Examples include outputting an object status, an object count, a ground process start time, a ground process end time, and a turnaround milestone. In some examples, computing system 200 outputs information to a data file stored locally on a storage device of the computing system. Additionally or alternatively, information can be output to a different computing system.

Computing system 200 may comprise any suitable configuration. Computing system 200 may be local or remote to camera 110 in various examples. In some examples, computing system 200 comprises camera 110. In some examples, computing system 200 comprises two or more computing systems configured for distributed computing (e.g., enterprise computing, cloud computing). In some examples, object classification data 210 is available to one or more computing systems via an API. Example computing systems are discussed in more detail below with regard to FIG. 6.

As mentioned above, inference logic 230 can be configured to determine a status of a loadable object. FIGS. 3A-3C illustrate an example in which object classification data is used to determine a loading status of a cargo item. First, FIG. 3A shows an example image frame 300 with object classification data superimposed. Image frame 300 comprises a schematic view of aircraft 100 at gate 102 (e.g., as imaged by camera 110). A multi-object tracker (e.g., multi-object tracker 202) detects fuselage 104 of aircraft 100 in image frame 300 and classifies the object as a "fuselage". As a result of the classification, the multi-object tracker assigns fuselage 104 a unique ID and determines a bounding box for the object. For example, a bounding box 304 is determined for fuselage 104. As described above, image frame pixels that are part of fuselage 104 are contained within bounding box 304. As such, the location of fuselage 104 may be represented by the location of bounding box 304. The multi-object tracker also identifies cargo truck 120 and determines a bounding box 306 for the cargo truck. The multi-object tracker also identifies an air cargo lift 308 and determines a bounding box 310 for the air cargo lift. The multi-object tracker also identifies a fuselage door 312 and determines a bounding box 314 for the fuselage door. For each object in the image frame, the classification, object ID, bounding box, and location form the object classification data for the object.

Next, FIG. 3B shows another example image frame 320. Image frame 320 represents the scene depicted in image frame 300 at a later time. Image frame 320 shows a cargo item 322. As shown in FIG. 3B, the multi-object tracker has determined a bounding box 324 surrounding cargo item 322. Fuselage 104 and bounding box 304 are also shown in FIG. 3B. Bounding boxes for other objects are omitted for clarity. As mentioned above, the object classification data produced by the multi-object tracker can comprise classification, object ID, bounding box, and location for each object in an image frame. Thus, the object classification data for image frame 320 comprises location data for fuselage 104 and location data for cargo item 322. Based on this location data, a distance 326 is determined. Distance 326 is determined based on reference points (black dots) located at the center of each of bounding box 304 and bounding box 324. In other examples, any other suitable reference point can be used for a bounding box.

Next, FIG. 3C shows a further example image frame 340. Image frame 340 represents the scene depicted in image frame 320 at a later time. As shown, cargo item 322 has moved from image frame 320 to image frame 340. Thus, the multi-object tracker has determined an updated position for bounding box 324. Bounding box 304 also is shown for fuselage 104. The object classification data for image frame 340 comprises location data for fuselage 104 and location data for cargo item 322. Based on the location of fuselage 104 and the location of cargo item 322, a distance 342 is determined. Distance 342 is greater than distance 326. This indicates that cargo item 322 is moving away from fuselage 104. Thus, inference logic 230 determines that the cargo item 322 is being unloaded. As such, a status of "unloading" can be output for cargo item 322.

As mentioned above, inference logic 320 also can comprise determining a status for objects other than cargo item 322. For example, inference logic can determine the status of aircraft 100 as "parked" due to a location of the aircraft in the image frame and/or due to a constant location of the aircraft across two or more image frames. Further, inference logic can determine the status of the fuselage door 312 as "open" based on location, orientation, and/or appearance of the fuselage door. In some examples, one or more conditions precedent can be applied before monitoring objects. As a more specific example, inference logic can be configured to determine that the status of airplane 100 is parked and/or the status of fuselage door 312 is open prior to determining a status of cargo item 322. Further, in some examples, inference logic is configured to determine that a location of cargo item 322 is within a bounding box for aircraft 100 prior to determining a status of the cargo item 322.

FIGS. 4A-4C illustrate an example scenario where inference logic is used to determine a loading status of a passenger. First, FIG. 4A shows an example image frame 400 depicting a schematic view of aircraft 100 at gate 102. As described above, a multi-object tracker (e.g., multi-object tracker 202) detects fuselage 104, classifies the object as a "fuselage", and determines a bounding box 404 for fuselage 104. The multi-object tracker also identifies boarding stairs 406 and determines a bounding box 408 for the boarding stairs. For each object in the image frame, the classification, object ID, bounding box, and location form the object classification data for the object.

Next, FIG. 4B shows another example image frame 410. Image frame 410 represents the scene depicted in image frame 400 at a later time. Image frame 410 shows a passenger 412 on boarding stairs 406. As shown in FIG. 4B, the multi-object tracker also has determined a bounding box 414 surrounding passenger 412. As mentioned above, the object classification data produced by the multi-object tracker can comprise classification, object ID, bounding box, and location for each object in the image frame. Thus, the object classification data for image frame 410 comprises location data for fuselage 104 and location data for passenger 412. Based on this location data, a distance 418 is determined. Distance 418 is determined based on reference points (black dots) located at the center of each of bounding box 404 of fuselage 104 and bounding box 414 of passenger 412. In other examples, any other suitable reference point can be used for a bounding box.

Next, FIG. 4C shows a further example image frame 420. Image frame 420 represents the scene depicted in image frame 410 at a later time. As shown, passenger 412 has moved up the boarding stairs 406. Thus, the multi-object tracker has determined an updated position for bounding box 414 surrounding passenger 412. Bounding box 404 also is shown for fuselage 104. The object classification data for image frame 420 comprises location data for fuselage 104 and location data for passenger 412. Based on the location of fuselage 104 and the location of passenger 412, a distance 422 is determined. Distance 422 is less than distance 418. This indicates that passenger 412 is moving towards fuselage 104. Therefore, the inference logic determines that the passenger 412 is being loaded. As such, a status of "loading" can be output for passenger 412.

As mentioned above, one or more conditions precedent can be applied before monitoring objects. As a more specific example, inference logic can be configured to determine that the status of airplane 100 is parked and/or boarding stairs 406 are identified in the image frame prior to determining a status of passenger 412. Further, in some examples, inference logic is configured to determine that a location of passenger 412 is within a bounding box for aircraft 100 prior to determining a status of the passenger 412.

FIGS. 5A-5B show a flow diagram of an example method 500 for determining a status of a loadable object. Method 500 can be performed by computing system 200, for example. At 502 of FIG. 5A, method 500 comprises obtaining object classification data for a plurality of image frames. The object classification data comprises location data for a fuselage of an aircraft and location data for a loadable object. In some examples, at 504, method 500 comprises inputting the image frames into a trained multi-object tracker configured to identify one or more objects in the plurality of image frames to form the object classification data. In some examples, the method comprises obtaining first object classification data for a first plurality of image frames of a first aircraft at a first gate, and obtaining second classification data for a second plurality of image frames of a second aircraft at a second gate. In some examples, at 506, the image frames are obtained in real-time (e.g., real-time video) and the method is performed in real-time.

In some examples, at 508, the loadable object comprises one of a cargo item, a luggage item, or a passenger. As described above, FIGS. 3B-3C show an example in which the loadable object comprises a cargo item. FIGS. 4B-4C show an example in which the loadable object comprises a passenger.

Continuing, at 510, method 500 comprises, based at least on the location data for the fuselage and the location data for the loadable object, determining a first distance between the fuselage and the loadable object in a first frame of the plurality of image frames. In some examples, at 512, the method comprises determining a bounding box for the aircraft, and determining the loadable object is located within the bounding box as a condition precedent to determining the first distance. In this manner, the method may check that this condition is met prior to determining the first distance. As such, in some examples, a loadable object outside the bounding box of the aircraft may be ignored as it pertains to determining the first distance. In some examples, at 514, the method comprises determining that the aircraft is parked at a gate as a condition precedent to determining the first distance. In some examples, at 516, the method comprises determining that a cargo truck is present at the gate as a condition precedent to determining the first distance. For example, inference logic 230 may check for a presence of cargo truck 120 prior to determining distance 326. In some examples, the method comprises determining that an air cargo lift (e.g., air cargo lift 308) is present at the gate as a condition precedent to determining the first distance. In some examples, the method comprises determining that a boarding stairs (e.g., boarding stairs 406) is present at the gate as a condition precedent to determining the first distance. In some examples, at 518, the method comprises determining that a door of the fuselage (e.g., fuselage door 312) is open as a condition precedent to determining the first distance. In some examples, method 500 comprises checking for a combination of two or more conditions at 512, 514, 516, or 518 as a condition precedent to determining the first distance.

Continuing, method 500 further comprises, at 520, based at least on the location data for the fuselage and the location data for the loadable object, determining a second distance between the fuselage and the loadable object in a second, later frame of the plurality of image frames.

At 522, method 500 further comprises determining that the loadable object is being loaded based at least on the second distance being less than the first distance, or determining that the loadable object is being unloaded based at least on the second distance being greater than the first distance. As described above, FIGS. 3B-3C illustrate an example of determining that a cargo item is being unloaded based on distance 342 being greater than distance 326. Additionally, FIGS. 4B-4C illustrate an example of determining that a passenger is being loaded based on distance 422 being less than distance 418.

Continuing to FIG. 5B, at 524, method 500 further comprises outputting the determination that the loadable object is being loaded or unloaded. In some examples, at 526, the method further comprises maintaining a count for loadable objects by incrementing the count for each loadable object determined as being loaded and decrementing the count for each loadable object determined as being unloaded. In some examples, the count can be compared to a known value to determine a percentage progress for a ground process. For example, given a known value of four cargo items to be loaded onto an aircraft and a count of three cargo items determined as being loaded, the method may output a progress of 75% for cargo loading. In some examples, at 528, method 500 comprises outputting a time for a turnaround milestone. Examples of turnaround milestones that can be output include a cargo loading start time, a cargo loading end time, a cargo unloading start time, a cargo unloading end time, a passenger loading start time, a passenger loading end time, a passenger unloading start time, and a passenger unloading end time. In some examples, identification of a first loadable object may indicate a start time for a respective ground process. In some examples, 100% progress on a ground process may indicate an end time for a respective ground process.

As discussed above, obtaining object classification data at 502 may comprise obtaining first and second object classification data for a respective first and second aircraft. Thus, in some examples, at 520, method 500 comprises maintaining a count for loadable objects on a second aircraft at a second gate.

Figure 6:
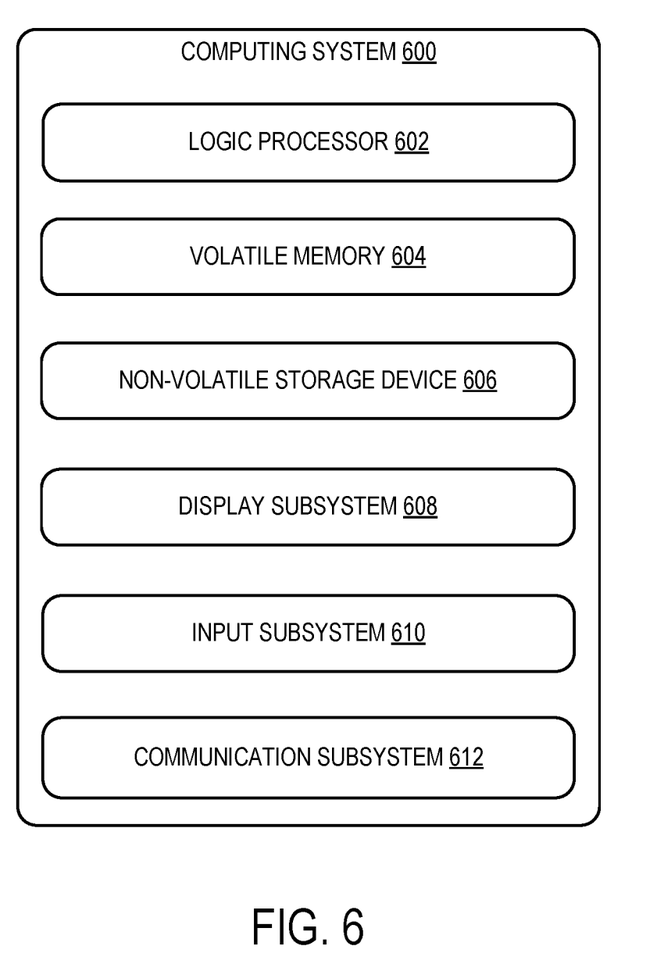
FIG. 6 shows a block diagram of an example computing system.

FIG. 6 illustrates an example computing system 600 that can be utilized to implement the method 400 described above. Computing system 600 is an example of computing system 200. Computing system 600 includes a logic processor 602, volatile memory 604, and a non-volatile storage device 606. Computing system 600 can optionally include a display subsystem 608, input subsystem 610, communication subsystem 612 connected to a computer network, and/or other components not shown in FIG. 6. These components are typically connected for data exchange by one or more data buses when integrated into single device, or by a combination of data buses, network data interfaces, and computer networks when integrated into separate devices connected by computer networks.

The non-volatile storage device 606 stores various instructions, also referred to as software, that are executed by the logic processor 602. Logic processor 602 includes one or more physical devices configured to execute the instructions. For example, the logic processor 602 can be configured to execute instructions that are part of one or more applications, programs, routines, libraries, objects, components, data structures, or other logical constructs. Such instructions can be implemented to perform a task, implement a data type, transform the state of one or more components, achieve a technical effect, or otherwise arrive at a desired result.

The logic processor 602 can include one or more physical processors (hardware) configured to execute software instructions. Additionally or alternatively, the logic processor 602 can include one or more hardware logic circuits or firmware devices configured to execute hardware-implemented logic or firmware instructions. Processors of the logic processor 602 can be single-core or multi-core, and the instructions executed thereon can be configured for sequential, parallel, and/or distributed processing. Individual components of the logic processor 602 optionally can be distributed among two or more separate devices, which can be remotely located and/or configured for coordinated processing. Aspects of the logic processor 602 can be virtualized and executed by remotely accessible, networked computing devices configured in a cloud-computing configuration. In such a case, these virtualized aspects are run on different physical logic processors of various different machines, it will be understood.

Non-volatile storage device 606 includes one or more physical devices configured to hold instructions executable by the logic processors to implement the methods and processes described herein. When such methods and processes are implemented, the state of non-volatile storage device 606 can be transformed—e.g., to hold different data.

Non-volatile storage device 606 can include physical devices that are removable and/or built-in. Non-volatile storage device 606 can include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 606 can include nonvolatile, dynamic, static, read/write, read-only, sequential-access, location-addressable, file-addressable, and/or content-addressable devices. It will be appreciated that non-volatile storage device 606 is configured to hold instructions even when power is cut to the non-volatile storage device 606.

Volatile memory 604 can include physical devices that include random access memory. Volatile memory 604 is typically utilized by logic processor 602 to temporarily store information during processing of software instructions. It will be appreciated that volatile memory 604 typically does not continue to store instructions when power is cut to the volatile memory 604.

Aspects of logic processor 602, volatile memory 604, and non-volatile storage device 606 can be integrated together into one or more hardware-logic components. Such hardware-logic components can include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" can be used to describe an aspect of the computing system 600 typically implemented in software by a processor to perform a particular function using portions of volatile memory, which function involves transformative processing that specially configures the processor to perform the function. Thus, a module, program, or engine can be instantiated via logic processor 602 executing instructions held by non-volatile storage device 606, using portions of volatile memory 604. It will be understood that different modules, programs, and/or engines can be instantiated from the same application, service, code block, object, library, routine, API, function, etc. Likewise, the same module, program, and/or engine can be instantiated by different applications, services, code blocks, objects, routines, APIs, functions, etc. The terms "module," "program," and "engine" can encompass individual or groups of executable files, data files, libraries, drivers, scripts, database records, etc.

Display subsystem 608 typically includes one or more displays, which can be physically integrated with or remote from a device that houses the logic processor 602. Graphical output of the logic processor executing the instructions described above, such as a graphical user interface, is configured to be displayed on display subsystem 608.

Input subsystem 610 typically includes one or more of a keyboard, pointing device (e.g., mouse, trackpad, finger operated pointer), touchscreen, microphone, and camera (e.g., camera 110). Other input devices can also be provided.

Communication subsystem 612 is configured to communicatively couple various computing devices described herein with each other, and with other devices. Communication subsystem 612 can include wired and/or wireless communication devices compatible with one or more different communication protocols. As non-limiting examples, the communication subsystem can be configured for communication via a wireless telephone network, or a wired or wireless local- or wide-area network by devices such as a 3G, 4G, 5G, or 6G radio, WIFI card, ethernet network interface card, BLUETOOTH radio, etc. In some embodiments, the communication subsystem can allow computing system 10 to send and/or receive messages to and/or from other devices via a network such as the Internet. It will be appreciated that one or more of the computer networks via which communication subsystem 612 is configured to communicate can include security measures such as user identification and authentication, access control, malware detection, enforced encryption, content filtering, etc., and can be coupled to a wide area network (WAN) such as the Internet.

The subject disclosure includes all novel and non-obvious combinations and subcombinations of the various features and techniques disclosed herein. The various features and techniques disclosed herein are not necessarily required of all examples of the subject disclosure. Furthermore, the various features and techniques disclosed herein can define patentable subject matter apart from the disclosed examples and can find utility in other implementations not expressly disclosed herein.

To the extent that terms "includes," "including," "has," "contains," and variants thereof are used herein, such terms are intended to be inclusive in a manner similar to the term "comprises" as an open transition word without precluding any additional or other elements.

Further, the disclosure comprises configurations according to the following clauses.

Clause 1. A method of determining a status of an aircraft at an airport, the method comprising: obtaining object classification data for a plurality of image frames, the object classification data comprising location data for a fuselage of the aircraft and location data for a loadable object; based at least on the location data for the fuselage and the location data for the loadable object, determining a first distance between the fuselage and the loadable object in a first frame of the plurality of image frames; based at least on the location data for the fuselage and the location data for the loadable object, determining a second distance between the fuselage and the loadable object in a second, later frame of the plurality of image frames; determining that the loadable object is being loaded based at least on the second distance being less than the first distance, or determining that the loadable object is being unloaded based at least on the second distance being greater than the first distance; and outputting the determination that the loadable object is being loaded or unloaded.

Clause 2. The method of clause 1, wherein obtaining the object classification data comprises inputting the plurality of images into a trained multi-object tracker configured to identify one or more objects in the plurality of image frames to form the object classification data.

Clause 3. The method of clause 1 or 2, wherein the loadable object comprises a passenger, a cargo item, or a luggage item.

Clause 4. The method of any of clauses 1 to 3, further comprising determining that the aircraft is parked at a gate of the airport based at least upon the object classification data as a condition precedent to determining the first distance.

Clause 5. The method of any of clauses 1 to 4, further comprising determining that a door of the fuselage is open as a condition precedent to determining the first distance.

Clause 6. The method of any of clauses 1 to 5, wherein obtaining the object classification data further comprises obtaining a bounding box for the fuselage of the aircraft, and wherein the method further comprises determining that the loadable object is located in the bounding box as a condition precedent to determining the first distance.

Clause 7. The method of any of clauses 1 to 6, further comprising maintaining a count for loadable objects on the aircraft by incrementing the count for each loadable object identified as being loaded, and decrementing the count for each object identified as being unloaded.

Clause 8. The method of clause 7, wherein the aircraft is a first aircraft at a first gate of the airport and the count is a first count for loadable objects on the first aircraft, and further comprising maintaining a second count for loadable objects on a second aircraft at a second gate of the airport.

Clause 9. A computing device, comprising: a logic subsystem; and a storage subsystem holding instructions executable by the logic subsystem to: obtain object classification data for a plurality of image frames, the object classification data comprising location data for a fuselage of the aircraft and location data for a loadable object, based at least on the location data for the fuselage and the location data for the loadable object, determine a first distance between the fuselage and the loadable object in a first frame of the plurality of image frames, based at least on the location data for the fuselage and the location data for the loadable object, determine a second distance between the fuselage and the loadable object in a second, later frame of the plurality of image frames, determine that the loadable object is being loaded based at least on the second distance being less than the first distance, or determine that the loadable object is being unloaded based at least on the second distance being greater than the first distance, and output the determination that the loadable object is being loaded or unloaded.

Clause 10. The computing device of clause 9, wherein the instructions are further executable to receive the plurality of image frames and input the plurality of images into a trained multi-object tracker configured to identify one or more objects in the plurality of images to form the object classification data.

Clause 11. The computing device of clause 9 or 10, wherein the loadable object comprises a passenger, a cargo item, or a luggage item.

Clause 12. The computing device of any of clauses 9 to 11, wherein the instructions are further executable to obtain a bounding box for the fuselage of the aircraft, and determine that the loadable object is located in the bounding box as a condition precedent for determining the first distance.

Clause 13. The computing device of any of clauses 9 to 12, wherein the instructions are further executable to maintain a count for loadable objects on the aircraft by incrementing the count for each loadable object identified as being loaded, and decrementing the count for each object identified as being unloaded.

Clause 14. A method of monitoring airport turnaround, the method comprising: receiving a plurality of image frames of a view of a gate at an airport; inputting the plurality of image frames into a trained multi-object tracker to obtain object classification data for each image frame of the plurality of image frames, the object classification data comprising location data for a fuselage of an aircraft at the gate and location data for a loadable object; based at least on the location data for the fuselage and the location data for the loadable object, determining a first distance between the fuselage and the loadable object in a first frame of the plurality of image frames; based at least on the location data for the fuselage and the location data for the loadable object, determining a second distance between the fuselage and the loadable object in a second, later frame of the plurality of image frames; determining that the loadable object is being loaded based at least on the second distance being less than the first distance, or determining that the loadable object is being unloaded based at least on the second distance being greater than the first distance; and outputting the determination that the loadable object is being loaded or unloaded.

Clause 15. The method of clause 14, wherein the trained multi-object classifier is configured to determine a bounding box for the fuselage of the aircraft, and wherein the method further comprises determining that the loadable object is located in the bounding box as a condition precedent for determining the first distance.

Clause 16. The method of clause 14 or 15, further comprising maintaining a count for loadable objects on the aircraft by incrementing the count for each loadable object identified as being loaded, and decrementing the count for each object identified as being unloaded.

Clause 17. The method of clause 16, further comprising receiving information related to the count of loadable objects on the aircraft and, based at least upon the count and the information related to the count, determining a turnaround status for the aircraft.

Clause 18. The method of any of clauses 14 to 17, wherein the loadable object comprises a cargo item, and wherein the method further comprises, based at least upon the object classification data, determining that a cargo loading truck is present at the gate as a condition precedent to determining the first distance.

Clause 19. The method of any of clauses 14 to 18, wherein the plurality of image frames comprises real-time video of the view of the gate, and the method is performed in real-time.

Clause 20. The method of any of clauses 14 to 19, further comprising outputting one or more of a cargo loading start time, a cargo loading end time, a cargo unloading start time, a cargo unloading end time, a passenger loading start time, a passenger loading end time, a passenger unloading start time, or a passenger unloading end time.

The invention claimed is:

1. A method of determining a status of an aircraft at an airport, the method comprising:
    obtaining object classification data for a plurality of image frames, the object classification data comprising location data for a fuselage of the aircraft and location data for a loadable object;
    based at least on the location data for the fuselage and the location data for the loadable object, determining a first distance between the fuselage and the loadable object in a first frame of the plurality of image frames;
    based at least on the location data for the fuselage and the location data for the loadable object, determining a second distance between the fuselage and the loadable object in a second, later frame of the plurality of image frames;
    determining that the loadable object is being loaded based at least on the second distance being less than the first distance, or determining that the loadable object is being unloaded based at least on the second distance being greater than the first distance; and
    outputting a determination that the loadable object is being loaded or unloaded.

2. The method of claim 1, wherein obtaining the object classification data comprises inputting the plurality of images into a trained multi-object tracker configured to identify one or more objects in the plurality of image frames to form the object classification data.

3. The method of claim 1, wherein the loadable object comprises a passenger, a cargo item, or a luggage item.

4. The method of claim 1, further comprising determining that the aircraft is parked at a gate of the airport based at least upon the object classification data as a condition precedent to determining the first distance.

5. The method of claim 1, further comprising determining that a door of the fuselage is open as a condition precedent to determining the first distance.

6. The method of claim 1, wherein obtaining the object classification data further comprises obtaining a bounding box for the fuselage of the aircraft, and wherein the method further comprises determining that the loadable object is located in the bounding box as a condition precedent to determining the first distance.

7. The method of claim 1, further comprising maintaining a count for loadable objects on the aircraft by
incrementing the count for each loadable object identified as being loaded, and decrementing the count for each object identified as being unloaded.

8. The method of claim 7, wherein the aircraft is a first aircraft at a first gate of the airport and the count is a first count for loadable objects on the first aircraft, and further comprising maintaining a second count for loadable objects on a second aircraft at a second gate of the airport.

9. A computing device, comprising:
a logic subsystem; and
a storage subsystem holding instructions executable by the logic subsystem to:
obtain object classification data for a plurality of image frames, the object classification data comprising location data for a fuselage of the aircraft and location data for a loadable object,
based at least on the location data for the fuselage and the location data for the loadable object, determine a first distance between the fuselage and the loadable object in a first frame of the plurality of image frames,
based at least on the location data for the fuselage and the location data for the loadable object, determine a second distance between the fuselage and the loadable object in a second, later frame of the plurality of image frames,
determine that the loadable object is being loaded based at least on the second distance being less than the first distance, or determine that the loadable object is being unloaded based at least on the second distance being greater than the first distance, and
output a determination that the loadable object is being loaded or unloaded.

10. The computing device of claim 9, wherein the instructions are further executable to receive the plurality of image frames and input the plurality of images into a trained multi-object tracker configured to identify one or more objects in the plurality of images to form the object classification data.

11. The computing device of claim 10, wherein the loadable object comprises a passenger, a cargo item, or a luggage item.

12. The computing device of claim 9, wherein the instructions are further executable to obtain a bounding box for the fuselage of the aircraft, and determine that the loadable object is located in the bounding box as a condition precedent for determining the first distance.

13. The computing device of claim 9, wherein the instructions are further executable to maintain a count for loadable objects on the aircraft by incrementing the count for each loadable object identified as being loaded, and decrementing the count for each object identified as being unloaded.

14. A method of monitoring airport turnaround, the method comprising:
receiving a plurality of image frames of a view of a gate at an airport;
inputting the plurality of image frames into a trained multi-object tracker to obtain object classification data for each image frame of the plurality of image frames, the object classification data comprising location data for a fuselage of an aircraft at the gate and location data for a loadable object;
based at least on the location data for the fuselage and the location data for the loadable object, determining a first distance between the fuselage and the loadable object in a first frame of the plurality of image frames;
based at least on the location data for the fuselage and the location data for the loadable object, determining a second distance between the fuselage and the loadable object in a second, later frame of the plurality of image frames;
determining that the loadable object is being loaded based at least on the second distance being less than the first distance, or determining that the loadable object is being unloaded based at least on the second distance being greater than the first distance; and
outputting a determination that the loadable object is being loaded or unloaded.

15. The method of claim 14, wherein the trained multi-object classifier is configured to determine a bounding box for the fuselage of the aircraft, and wherein the method further comprises determining that the loadable object is located in the bounding box as a condition precedent for determining the first distance.

16. The method of claim 14, further comprising maintaining a count for loadable objects on the aircraft by
incrementing the count for each loadable object identified as being loaded, and decrementing the count for each object identified as being unloaded.

17. The method of claim 16, further comprising receiving information related to the count of loadable objects on the aircraft and, based at least upon the count and the information related to the count, determining a turnaround status for the aircraft.

18. The method of claim 14, wherein the loadable object comprises a cargo item, and wherein the method further comprises, based at least upon the object classification data, determining that a cargo loading truck is present at the gate as a condition precedent to determining the first distance.

19. The method of claim 14, wherein the plurality of image frames comprises real-time video of the view of the gate, and the method is performed in real-time.

20. The method of claim 14, further comprising outputting one or more of a cargo loading start time, a cargo loading end time, a cargo unloading start time, a cargo unloading end time, a passenger loading start time, a passenger loading end time, a passenger unloading start time, or a passenger unloading end time.

* * * * *